US012360581B1

(12) United States Patent
Gangadharan et al.

(10) Patent No.: US 12,360,581 B1
(45) Date of Patent: Jul. 15, 2025

(54) WIRELESS BASEBAND MODEM DATAPATH USING COMPUTE IN MEMORY

(71) Applicant: EdgeQ, Inc., Santa Clara, CA (US)

(72) Inventors: Hariprasad Gangadharan, Karnataka (IN); Chaekwan Lee, San Jose, CA (US); Umesh Dattatraya Nimbhorkar, Karnataka (IN); Sriram Rajagopal, Karnataka (IN); Vinay Ravuri, Cupertino, CA (US)

(73) Assignee: EdgeQ, Inc., Santa Clara, CA (US)

( * ) Notice: Subject to any disclaimer, the term of this patent is extended or adjusted under 35 U.S.C. 154(b) by 64 days.

(21) Appl. No.: 18/410,277

(22) Filed: Jan. 11, 2024

(51) Int. Cl.
*G06F 1/32* (2019.01)

(52) U.S. Cl.
CPC .................. *G06F 1/32* (2013.01)

(58) Field of Classification Search
CPC . G06F 1/26; G06F 1/32; G06F 1/3203; G06F 1/3206; G06F 1/3209; G06F 1/3225
See application file for complete search history.

(56) References Cited

U.S. PATENT DOCUMENTS

| | | | |
|---|---|---|---|
| 2022/0414443 A1* | 12/2022 | Li .................... | G06F 7/5443 |
| 2023/0195316 A1* | 6/2023 | Park ..................... | G06F 1/3275 |
| 2023/0273733 A1* | 8/2023 | Sayyaparaju ......... | G06F 3/0659 |
| | | | 711/154 |
| 2024/0403527 A1* | 12/2024 | Chen .................. | G06F 30/3323 |
| 2025/0124988 A1* | 4/2025 | Hung ..................... | G11C 16/28 |

* cited by examiner

*Primary Examiner* — Raymond N Phan
(74) *Attorney, Agent, or Firm* — Michael North

(57) ABSTRACT

System and method embodiments are disclosed for merging computing hardware datapath to reduce energy consumption and improve throughput of modem signal processing functions on a Modem. Compute-in-memory (CIM) is used for data access and processing in parallel using processing elements integrated within memory chip. The processing throughput may significantly improve since data is accessed directly from the computational memory storage in parallel for processing and the clock speed for data processing may run at a higher spec than conventional approaches. Energy consumption for Modem processing is also reduced.

20 Claims, 6 Drawing Sheets

WIRELESS BASEBAND MODEM DATAPATH USING COMPUTE IN MEMORY

TECHNICAL FIELD

The present disclosure relates generally to modem operation in signal processing. More particularly, the present disclosure relates to systems and methods for merging computing hardware datapath to reduce energy consumption and improve throughput of modem signal processing functions on a Modem.

BACKGROUND

A modulator-demodulator, also known as a modem, is a computational device which is used to convert data into a signal. Modems play an important role for various fields, such as computer networking, wireless communication, etc. Core modem signal processing functions include channel estimation, modulation, demodulation, Physical layer (Phy) measurements, etc. These signal processing functions require data stored in a memory, e.g., a static random-access memory (SRAM), to be accessed row-by-row and processed by hardware digital accelerator logic.

Conventionally, computation and memory are kept separate. An SRAM is typically instanced as a hard macro and followed by processing using the hardware logic that implements datapath functions like adders and multipliers. Digital place and route (PNR) tools may be used to implement the whole block. Energy may be wasted storing and retrieving data row by row from or to the SRAM.

Accordingly, what is needed are systems and methods to reduce energy consumption and improve throughput of Modem signal processing functions on a Modem.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
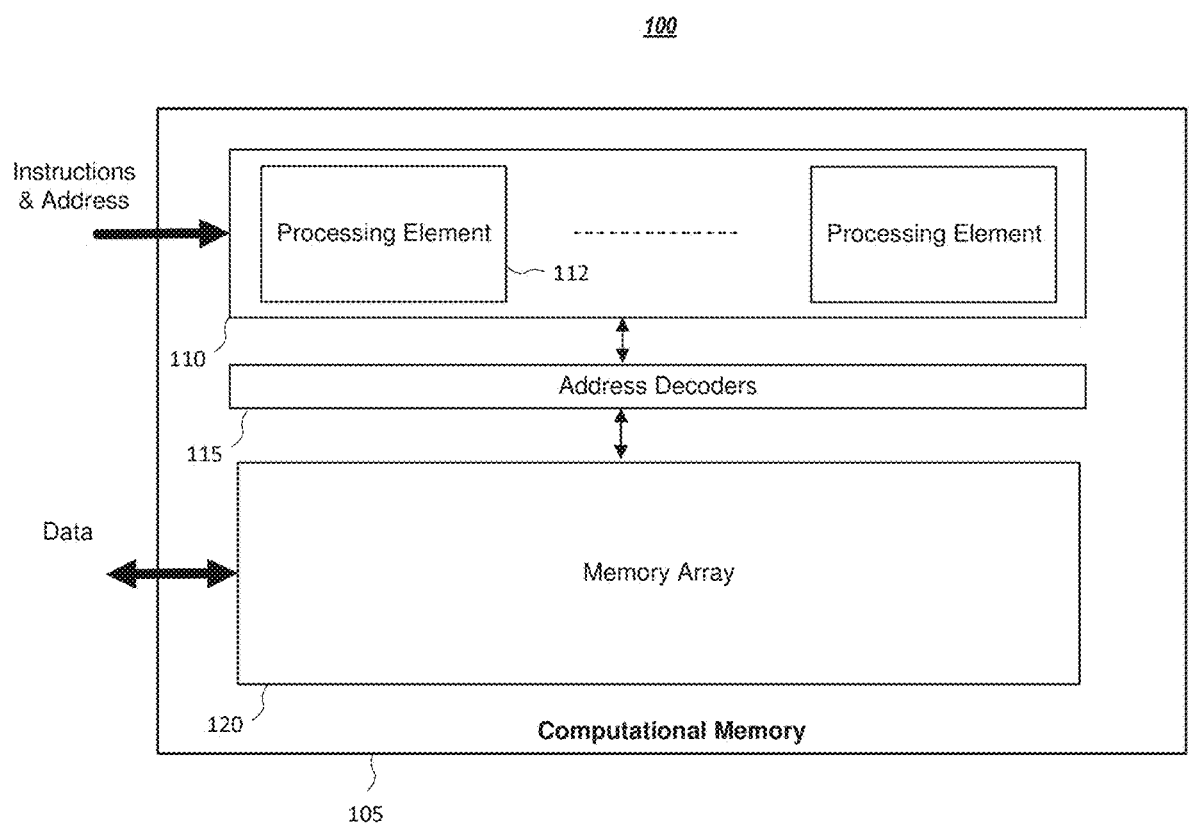
FIG. 1 depicts a block diagram of a computational memory, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion, components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" or "packet" shall not be interpreted as limiting embodiments of the present invention to certain networks, e.g., 5G wireless communication. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. Embodiments of Compute-in-Memory (CIM) in a Modem

In a communication system, a Modem handles various Modem signal processing functions, including channel estimation, modulation, demodulation, Phy measurements, etc. Conventionally, the implementing these functions requires accessing data stored in a memory, e.g., an SRAM, row-by-row and processing by hardware digital accelerator logic. Such data storing and retrieving row by row from or to the SRAM may be energy inefficient.

Computer-in-memory (also known in computing-in-memory or CIM) is process of performing both data storage and date computing entirely in a memory. Such a memory is also referred to as a computational memory, which has processing elements integrated on the same memory chip like a dynamic random-access memory (DRAM) or an SRAM hard macro instanced in a system-on-a-chip (SoC). CIM eliminates slow data accesses and relies exclusively on data stored in the memory. Therefore, computation performance may be improved significantly since the latency of SRAM memory access row by row is eliminated. CIM is managed by software running on one or more CPU's in a Modem IP or SoC. The software may divide CIM into smaller tasks which run in parallel.

FIG. 1 depicts a block diagram for a computational memory, according to embodiments of the present disclosure. The computational memory 105 comprises a processing element block (also referred to as a CIM block) 110, one or more address decoders 115, and a memory array 120. The memory array 120 comprises multiple memory elements for data reading or storing via a data I/O interface or port. The processing element block 110 comprises one or more processing elements that may be configured to perform one or more processing tasks. The processing element block 110 may access the memory array 120 via the one or more address decoders 115, which may comprise a row address decoder and a column address decoder. The processing element block 110 may receive instructions and address data via an instruction/address interface or port.

It shall be noted that the computational memory 105 may function as a conventional memory or as a computational memory for CIM when needed. Accordingly, the computational memory 105 may be used in compatibility with traditional memories with additional CIM capability.

Figure 2:
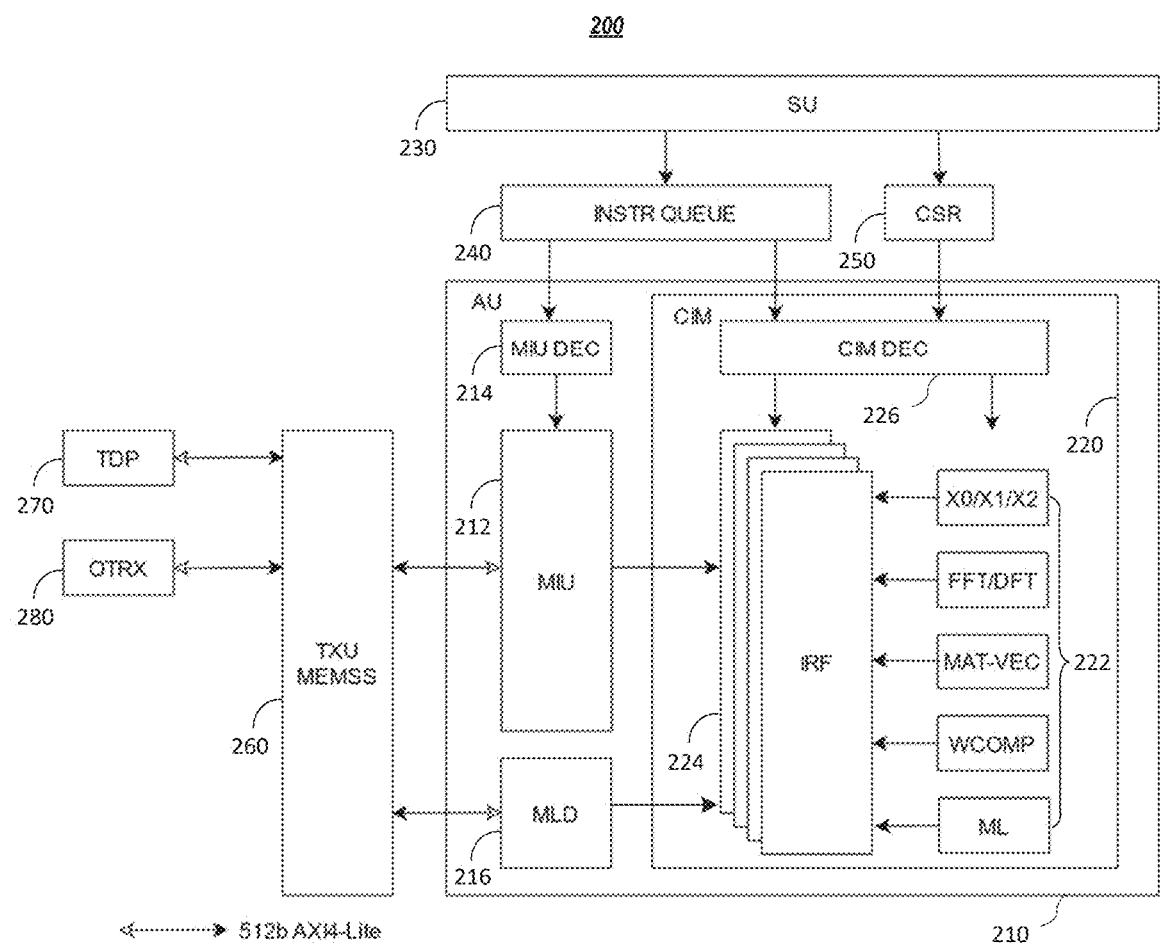
FIG. 2 depicts functional requirement for compute-in-memory (CIM) in a modem, according to embodiments of the present disclosure.

FIG. 2 depicts functional requirement for compute-in-memory (CIM) in a modem, according to embodiments of the present disclosure. The modem comprises an arithmetic unit (AU) 210, a scalar unit (SU) 230 (which may also referred to as a control processor), e.g., a RISC-V central processing unit (CPU), a time domain processing block (TDP) 270, and an outer transceiver (OTRX) 280 performing forward error correction (FEC) encoding/decoding.

The AU 210 is a computational memory capable of performing both data storage and date computing entirely within one memory chip. The AU 210 incorporates a CIM subsystem (also referred to as a CIM block) 220, a memory interface unit (MIU) 212 for data storage, one or more MIU decoders 214 for memory address decoding, and a maximum likelihood demodulator (MLD) 216, which is also a PE. The CIM subsystem 220 comprises multiple processing elements (PEs) 222 to process internal register file (IRFs) stored in corresponding CIM memory blocks 224, and a CIM decoder 226 for writing instruction and/or address information into the PEs 222 and/or the CIM memory blocks 224.

Each PE may be configured to function as a modem data processing block, e.g., X0/X1/X2, FFT/DFT, MAT-VEC, WCOMP, ML, et al., for a desired operation. As shown in FIG. 2, the X0/X1/X2 block is a PE performing high-speed low power arithmetic operation and permutation operation by accessing multiple rows of data in parallel at a corresponding IRF. The arithmetic operation may be multiplication and/or addition for multiple data types. The permutation operation includes one or more of splat, downsampling, upsampling, extraction, insertion and shuffling. The supported data types include signed/unsigned and/or real/complex data types and may be 8 bit, 16 bits, 32 bits, or 64 bits. The multipliers and adders may be implemented using circuit technologies.

The FFT/DFT block is a PE configured to perform high-speed low power Fast Fourier Transform (FFT) and Discrete Fourier Transform (DFT) for complex numbers by accessing multiple rows of data at a corresponding IRF in parallel. The multipliers and adders may be implemented using circuit technologies.

The Matrix Vector Multiplier (MAT-VEC) block is a PE configured to perform high-speed low power matrix operations by accessing multiple rows of data in parallel. The matrix operation includes matrix-matrix multiplication, matrix-vector multiplication, and/or matrix conjugation. The supports data types include real and complex numbers.

The weight computation (WCOMP) block is a PE configured to perform high-speed low power minimum mean squared error (MMSE) weight computation or other optimal search based demodulations by accessing the multiple rows of data at a corresponding IRF in parallel for complex numbers.

The ML block is a PE configured to perform high-speed low power machine learning (ML) operation by accessing the multiple rows of data at IRF in parallel. The operation includes convolution, matrix multiplication and activation function.

The Maximum Likelihood Demodulator (MLD) 216 is a sophisticated algorithm that selects the signal constellation point closest to the received signal. This process minimizes the probability of bit error by comparing the received signal with all possible transmitted signals and choosing the one with the highest probability of being the original signal. The mathematical operations performed include operations like matrix multiplication, QR decompositions, etc.

Instructions sent from the scalar unit (SU) 230 are queued in an instruction queue 240, which distributes the instructions between MIU decoders 214 for memory address decoding and the CIM decoder 226 for CIM configuring. The scalar unit (SU) 230 may also send configuration and status information to a configuration and status register (CSR) 250, which is a register to configure the PEs 222 for performing desired modem data processing operations, such as FFT, DFT, matrix operation, etc. The CIM decoder 226 is configured to write instruction and/or address information into the PEs 222 and the CIM memory blocks 224.

A memory subsystem (MEMSS) 260 couples between the AU 210 and the TDP 270 and the OTRX 280. The MEMSS 260 transmits data to the CIM subsystem 220 via the MIU 212 for CIM procession and reads CIM processed data from the CIM subsystem 220 via the MIU 212. The MEMSS 260 may also couple to the MLD 216, which is also a PE, for digital signal demodulating operation.

Computing hardware datapath may be merged to reduce energy consumption and improve throughput of modem signal processing functions on a modem. CIM may be used for data access and processing in parallel using processing elements within the CIM subsystem. It shall be noted that the CIM subsystem 220 may be a hard macro IP instanced in an SoC, instead of being a standalone chip. The processing throughput may significantly improve since data is accessed directly from the computational memory storage in parallel for processing and the clock speed for data processing may run at a higher spec than conventional approach. Energy consumption for Modem processing is also reduced since the CIM can be shut off quicker than a conventional approach.

B. Embodiments of CIM Data Flow in a Modem

Data may be transferred from one memory block to another memory block for CIM operation. In one or more embodiments, multiple transfers from memory to data-path to memory may be required to achieve desired modem functionality.

Figure 3:
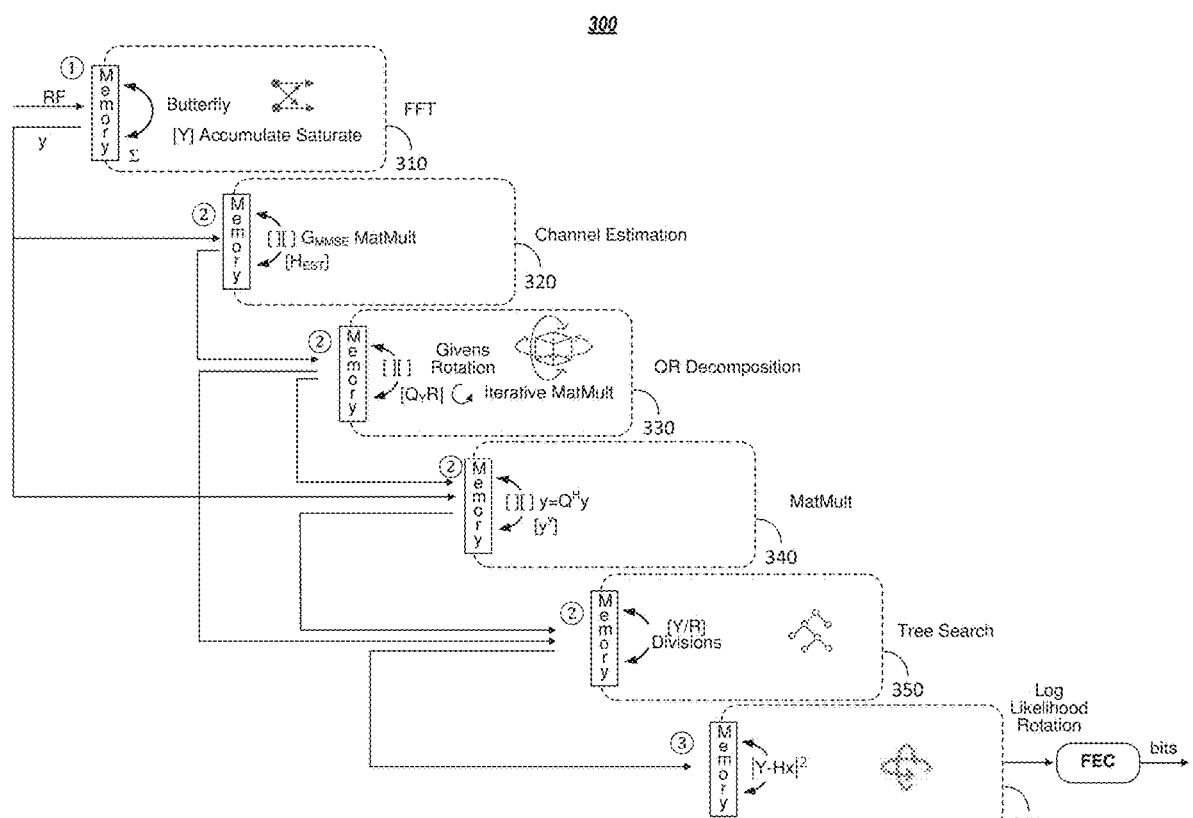
FIG. 3 depicts CIM data flow in a modem, according to embodiments of the present disclosure.

FIG. 3 depicts CIM data flow in a modem, according to embodiments of the present disclosure. As shown in the figure, there are three types of physical memories or memory blocks involved in CIM operation for modem functionality. The first type of memory block, represented as ① in FIG. 3, stores incoming data for CIM FFT operation 310. The second type of memory block, represented as ② in FIG. 3, is used for channel estimation (CE) 320, QR decomposition (QRD) 330, divisions (D) 350, and/or matrix multiplication (MatMult) operations 340. The third type of memory block, represented as ③ in FIG. 3, is used for storing CIM operation results 360 for log likelihood ratio (LLR) operation.

It shall be noted that data transfer among different memory blocks may be performed in parallel or sequentially. For example, output data from CIM FFT operation 310 at the memory block ① may be transmitted for both CE operation 320 and MatMult operation 340. In another example, output data from CIM QRD operation 330 at a second type of memory block ② may be transmitted for both MatMult operation 340 and division operation 350.

Also shown in FIG. 3, output data from CIM FFT operation 310 at the memory block ① is transmitted to a second type of memory block ② for CE operation 320. Afterwards, output data from CIM CE operation 320 is transmitted to another second type of memory block ② for QRD operation 330.

Figure 4:
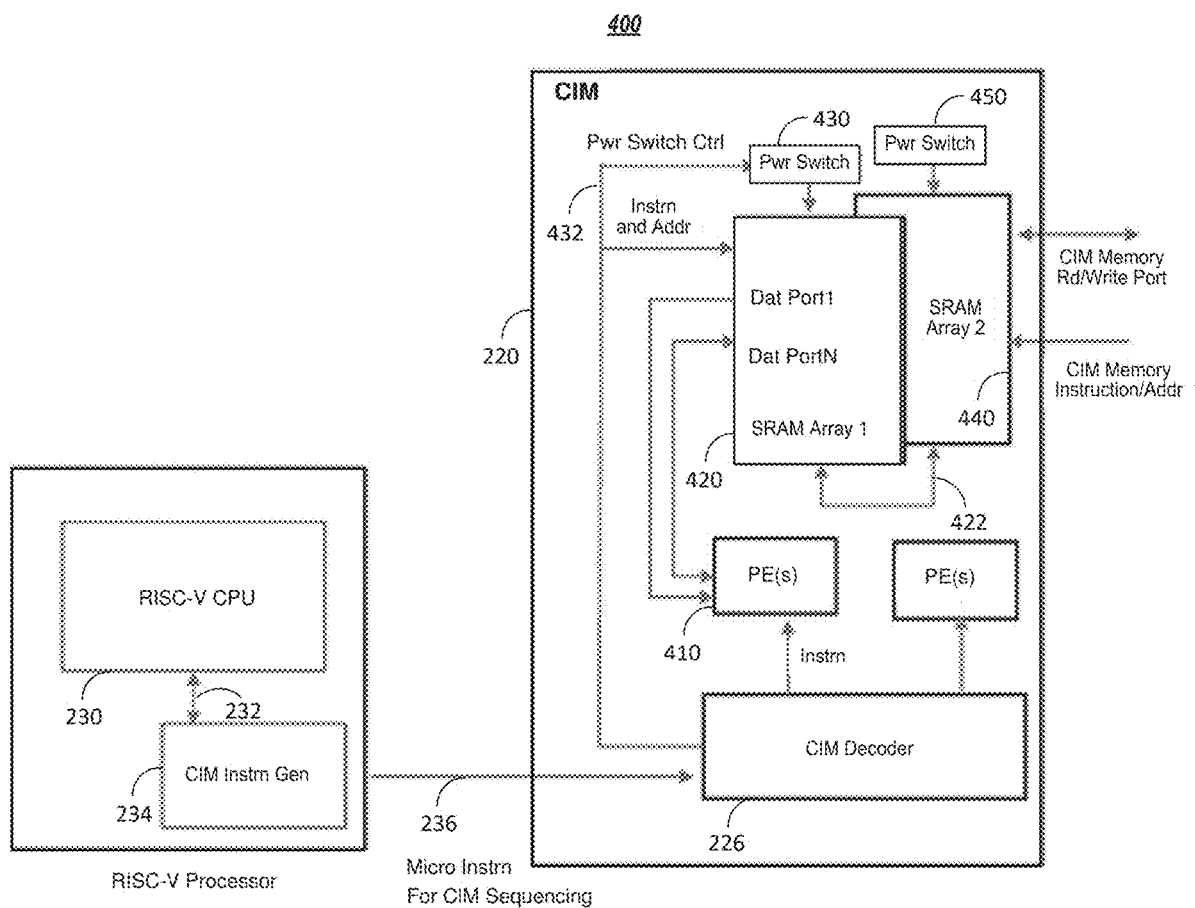
FIG. 4 graphically depicts an implementation of the modem functionality using a CIM subsystem, according to embodiments of the present disclosure.
Figure 5:
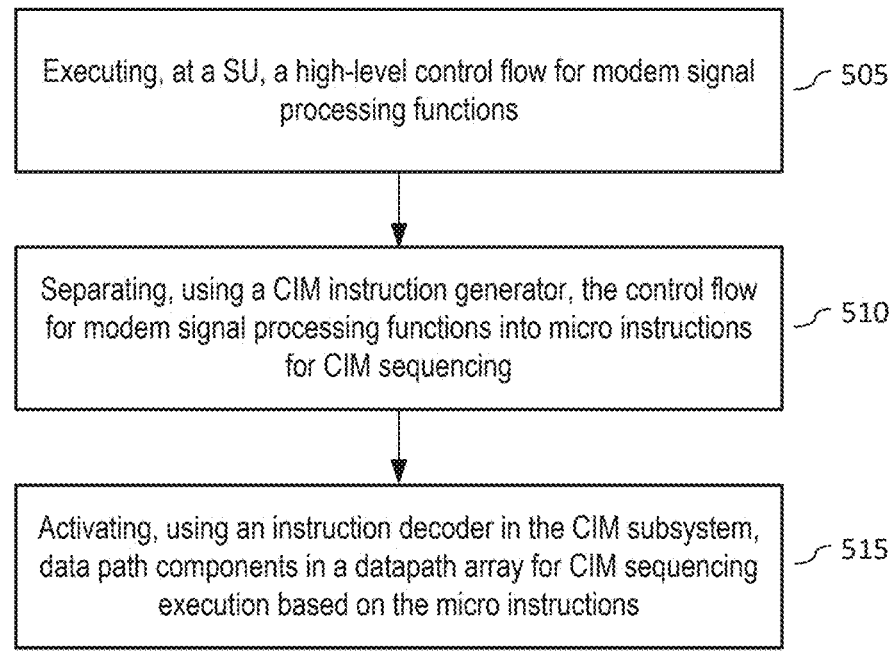
FIG. 5 depicts a process for the implementation of the modem functionality, according to embodiments of the present disclosure.

FIG. 4 graphically depicts an implementation of the modem functionality using a CIM subsystem and FIG. 5 depicts a process for such an implementation, according to embodiments of the present disclosure. The implementation of the Modem functionality involves a CIM subsystem 220. In step 505, modem software running on the SU 230, e.g., a RISC-V CPU, executes a high-level control flow 232 for modem signal processing functions. In step 510, the control flow for modem signal processing functions is separated, using a CIM instruction generator 234, into micro instructions 236 for CIM sequencing.

In step 515, a CIM decoder 226 in the CIM subsystem 220 activates one or more PEs 410 for CIM sequencing execution based on the micro instructions. Power saving may be achieved due to CIM operations with reduced data access latency and reduced active time due to higher performance of CIM.

Figure 6:
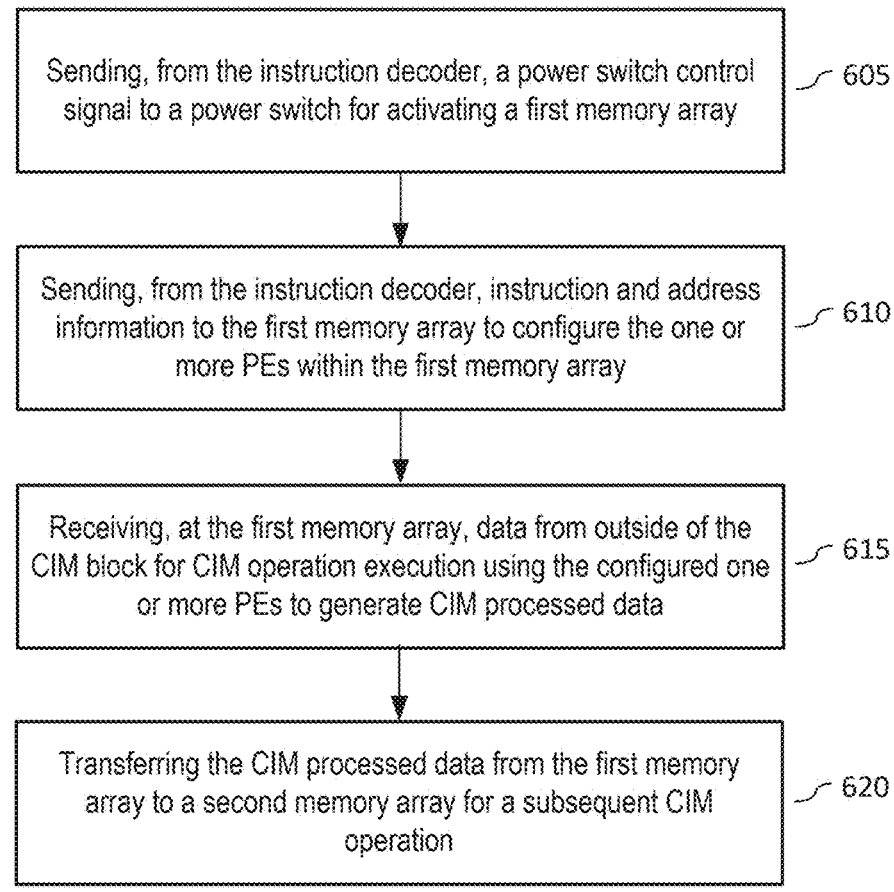
FIG. 6 depicts a process for activating processing elements for CIM sequencing, according to embodiments of the present disclosure.

FIG. 6 depicts a process for activating PEs components for CIM sequencing with respect to FIG. 4, according to embodiments of the present disclosure. The PEs to be activated may comprise one or more memory arrays, with each array comprising memory blocks and one or more PEs. Each memory array may be activated via a power switch for CIM operation.

In step 605, the CIM decoder 226 sends a power switch control signal 432 to a power switch 430 for activating a first memory array 420. In step 610, once the first memory array 420 is activated, the CIM decoder 226 sends instruction and address information to the first memory array 420 to configure the one or more PEs within the first memory array 420. In step 615, the first memory array 420 receives data from outside of the CIM block for CIM operation execution using the configured one or more PEs to generate CIM processed data. The CIM operation may be an FFT/DFT, a CE, a QRD, a MatMult, a Division, or a combination thereof as shown in FIG. 3.

In step 620, the CIM processed data 422 from the first memory array 420 may be transferred to a second memory array 440 for a subsequent CIM operation. Similar to the first memory array 420, the second memory array 440 may be activated via a corresponding power switch 450 under a separate power switch control signal from the CIM decoder 226.

C. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, modem, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Aspects of the present disclosure may be encoded upon one or more non-transitory computer-readable media with instructions for one or more processors or processing units to cause steps to be performed. It shall be noted that non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for implementing modem functionality on a modem, the method comprising:
    executing, at a control processor, a control flow for modem signal processing functions;
    separating, using a compute-in-memory (CIM) instruction generator, the control flow for modem signal processing functions into micro instructions for CIM sequencing; and
    activating, using a CIM decoder in a CIM subsystem, one or more processing elements (PEs) for CIM sequencing execution based on the micro instructions, the CIM subsystem comprises one or more memory arrays with each memory array comprising memory blocks and PEs for CIM operation.

2. The method of claim 1, wherein the CIM operation comprises one or more of:
    arithmetic operation comprising multiplication and/or addition for multiple data types;
    permutation operation comprising one or more of splat, downsampling, upsampling, extraction, insertion and shuffling;
    Fast Fourier Transform (FFT) and Discrete Fourier Transform (DFT) for complex numbers;
    matrix operation comprising one or more of matrix-matrix multiplication, matrix-vector multiplication, and matrix conjugation;
    minimum mean squared error (MMSE) weight computation, or optimal search based demodulations; and
    machine learning (ML) operation comprising convolution, matrix multiplication and activation function.

3. The method of claim 1, wherein the control processor is a RISC-V central processing unit (CPU).

4. The method of claim 1, wherein CIM operations in the one or more memory arrays are implemented in parallel or sequentially.

5. The method of claim 1, wherein activating one or more PEs for CIM sequencing comprising:
    sending, from the CIM decoder, a power switch control signal to a power switch for activating a first memory array among the one or more memory arrays;
    sending, from the CIM decoder, instruction and address information to the first memory array to configure the one or more PEs within the first memory array;
    receiving, at the first memory array, data from outside of the CIM subsystem for CIM operation execution using the configured one or more PEs to generate CIM processed data.

6. The method of claim 1, wherein three types of memory blocks are involved in CIM operation for modem functionality, the three types of memory blocks comprising:
    a first type of memory blocks stores incoming data for CIM Fast Fourier Transform (FFT) operation;
    a second type of memory blocks is used for channel estimation (CE), QR decomposition (QRD), divisions (D), and/or matrix multiplication (MatMult) operations; and
    a third type of memory blocks is used for storing CIM operation results for log likelihood ratio (LLR) operation.

7. The method of claim 1, wherein instructions sent from the control processor are queued in an instruction queue that distributes the instructions between a memory interface unit (MIU) decoder for memory address decoding and the CIM decoder for CIM configuring.

8. The method of claim 1, wherein the control processor sends configuration and status information to a configuration and status register (CSR) to configure the one or more PEs for performing desired modem data processing operations.

9. The method of claim 5, wherein activating one or more PEs for CIM sequencing further comprising:
    transferring the CIM processed data from the first memory array to a second memory array for a subsequent CIM operation.

10. The method of claim 6, wherein data transfer among different memory blocks is performed in parallel or sequentially.

11. A modem for signal processing comprising:
a control processor that executes a control flow for modem signal processing functions;
a compute-in-memory (CIM) instruction generator that separates the control flow for modem signal processing functions into micro instructions for CIM sequencing;
an arithmetic unit (AU) comprising a memory interface unit (MIU) for data storage, a CIM subsystem, the CIM subsystem comprising:
multiple CIM memory blocks;
multiple processing elements (PEs); and
a CIM decoder for writing instruction into the multiple PEs and for writing address information into the multiple CIM memory blocks, the CIM decoder activates one or more PEs among the multiple PEs for CIM sequencing execution based on the micro instructions.

12. The modem of claim 11, wherein the CIM operation comprises one or more of:
arithmetic operation comprising multiplication and/or addition for multiple data types;
permutation operation comprising one or more of splat, downsampling, upsampling, extraction, insertion and shuffling;
Fast Fourier Transform (FFT) and Discrete Fourier Transform (DFT) for complex numbers;
matrix operation comprising one or more of matrix-matrix multiplication, matrix-vector multiplication, and matrix conjugation;
minimum mean squared error (MMSE) weight computation, or optimal search based demodulations; and
machine learning (ML) operation comprising convolution, matrix multiplication and activation function.

13. The modem of claim 11, wherein the control processor is a RISC-V central processing unit (CPU).

14. The modem of claim 11, wherein CIM operations in the multiple CIM memory blocks are implemented in parallel or sequentially.

15. The modem of claim 11, wherein the CIM decoder activates one or more PEs using steps comprising:
sending, from the CIM decoder, a power switch control signal to a power switch for activating a first CIM memory block among the multiple CIM memory blocks; and
sending, from the CIM decoder, instruction and address information to the first CIM memory block to configure the multiple PEs within the first CIM memory block.

16. The modem of claim 11, wherein the multiple CIM memory blocks have three types of memory blocks comprising:
a first type of memory blocks stores incoming data for CIM Fast Fourier Transform (FFT) operation;
a second type of memory blocks is used for channel estimation (CE), QR decomposition (QRD), divisions (D), and/or matrix multiplication (MatMult) operations; and
a third type of memory blocks is used for storing CIM operation results for log likelihood ratio (LLR) operation.

17. The modem of claim 11 further comprising:
an instruction queue that queues the micro instructions and distributes the micro instructions between a memory interface unit (MIU) decoder for memory address decoding and the CIM decoder for CIM configuring; and
a configuration and status register (CSR) that receives configuration and status information from the control processor to configure the multiple PEs for performing desired modem data processing operations.

18. The modem of claim 15, wherein the first CIM memory block receives data from outside of the CIM subsystem for CIM operation execution using the configured one or more PEs to generate CIM processed data.

19. The modem of claim 16, wherein data transfer among different memory blocks is performed in parallel or sequentially.

20. The modem of claim 17 further comprising:
a memory subsystem (MEMSS) coupled to the AU, the MEMSS transmits data to the CIM subsystem via the MIU for CIM procession and reads CIM processed data from the CIM block via the MIU.

* * * * *